United States Patent
Bourse et al.

(10) Patent No.: US 11,146,183 B2
(45) Date of Patent: Oct. 12, 2021

(54) METHOD FOR CONTROLLING AN INVERTER

(71) Applicant: Safran Electrical & Power, Blagnac (FR)

(72) Inventors: Wenceslas Bourse, Blagnac (FR); Pascal Jacques Frederic Guy Toutain, Blagnac (FR)

(73) Assignee: Safran Electrical & Power, Blagnac (FR)

( * ) Notice: Subject to any disclaimer, the term of this patent is extended or adjusted under 35 U.S.C. 154(b) by 101 days.

(21) Appl. No.: 16/635,726

(22) PCT Filed: Aug. 2, 2018

(86) PCT No.: PCT/FR2018/052006
§ 371 (c)(1),
(2) Date: Jan. 31, 2020

(87) PCT Pub. No.: WO2019/025740
PCT Pub. Date: Feb. 7, 2019

(65) Prior Publication Data
US 2020/0228030 A1    Jul. 16, 2020

(30) Foreign Application Priority Data

Aug. 2, 2017 (FR) .................................. 1757432

(51) Int. Cl.
*H02M 7/5387* (2007.01)
*H02M 1/38* (2007.01)
*H02P 27/08* (2006.01)

(52) U.S. Cl.
CPC ......... *H02M 7/53871* (2013.01); *H02M 1/38* (2013.01); *H02P 27/08* (2013.01)

(58) Field of Classification Search
CPC ...... H02M 7/53871; H02M 1/38; H02M 7/00; H02M 7/21; H02M 7/527; H02M 7/529;
(Continued)

(56) References Cited

U.S. PATENT DOCUMENTS

| 4,528,486 A | 7/1985 | Flaig et al. |
| 5,694,010 A * | 12/1997 | Oomura .................... H02P 6/34 |
| | | 318/400.07 |
| 2016/0211772 A1 | 7/2016 | Degner et al. |

FOREIGN PATENT DOCUMENTS

EP    2 605 400 A1    6/2013

OTHER PUBLICATIONS

French Preliminary Search Report dated Apr. 5, 2018 in corresponding French Patent Application No. 1757432 (with English Translation of Category of Cited Documents), 3 pages.

(Continued)

*Primary Examiner* — Antony M Paul
(74) *Attorney, Agent, or Firm* — Oblon, McClelland, Maier & Neustadt, L.L.P.

(57) ABSTRACT

A method for controlling an inverter configured to power electrically a motor including a stator and a rotor capable of being rotated relative to the stator when the motor is electrically powered, the inverter including a plurality of switches suitable for being controlled to open/close in order to regulate the power supply of the motor, each switch having a predetermined transition time from a closed state to an open state, and a predetermined transition time from the open state to the closed state, wherein the method includes the step of not generating the command to open and close the switches when this violates the predetermined transition times from a closed state to an open state, and the predetermined transition times from the open state to the closed state.

10 Claims, 8 Drawing Sheets

(58) Field of Classification Search
CPC ......... H02M 7/5395; H02M 2007/483; H02M 2007/53878; H02P 27/08; H02P 1/00; H02P 1/04; H02P 1/12; H02P 1/16; H02P 1/163; H02P 1/18; H02P 1/24; H02P 1/26; H02P 1/28; H02P 1/42; H02P 1/46; H02P 1/465; H02P 3/00; H02P 3/24; H02P 6/00; H02P 6/12; H02P 6/15; H02P 6/16; H02P 6/20; H02P 6/28; H02P 6/32; H02P 7/29; H02P 9/009; H02P 9/302; H02P 21/32; H02P 21/34; H02P 21/00; H02P 23/00; H02P 23/0004; H02P 25/00; H02P 25/026; H02P 25/03; H02P 25/10; H02P 27/00; H02P 27/04; H02P 27/06; H02P 27/085

See application file for complete search history.

(56) References Cited

OTHER PUBLICATIONS

International Search Report dated Mar. 26, 2019 in PCT/FR2018/052006 filed on Aug. 2, 2018, citing documents AA, AB and AO therein, 2 pages.

\* cited by examiner

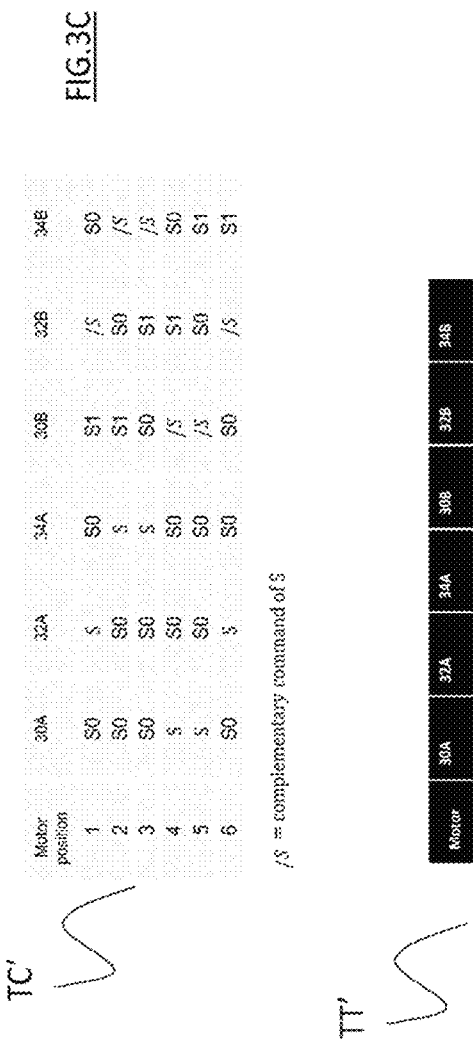

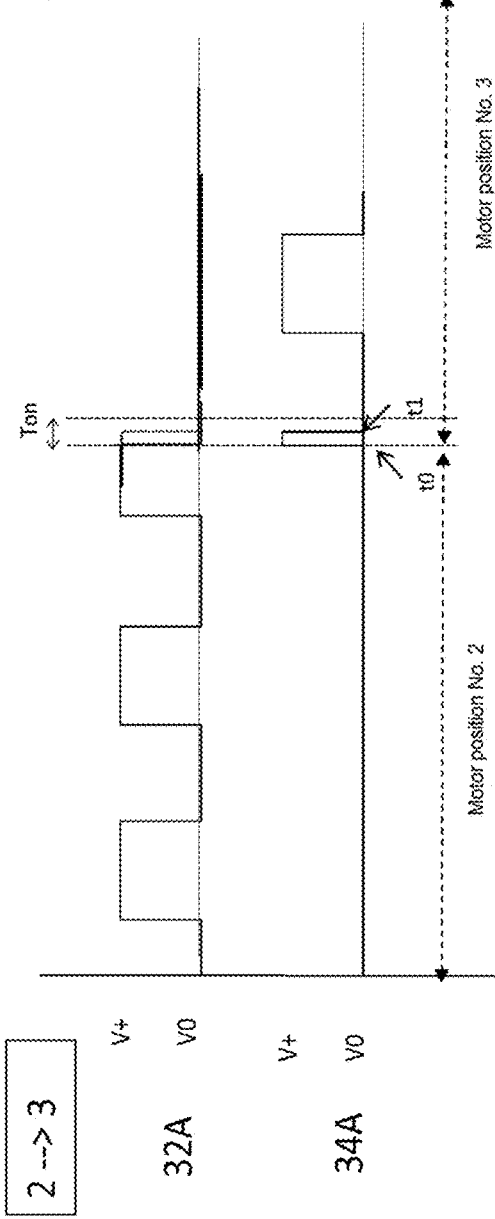
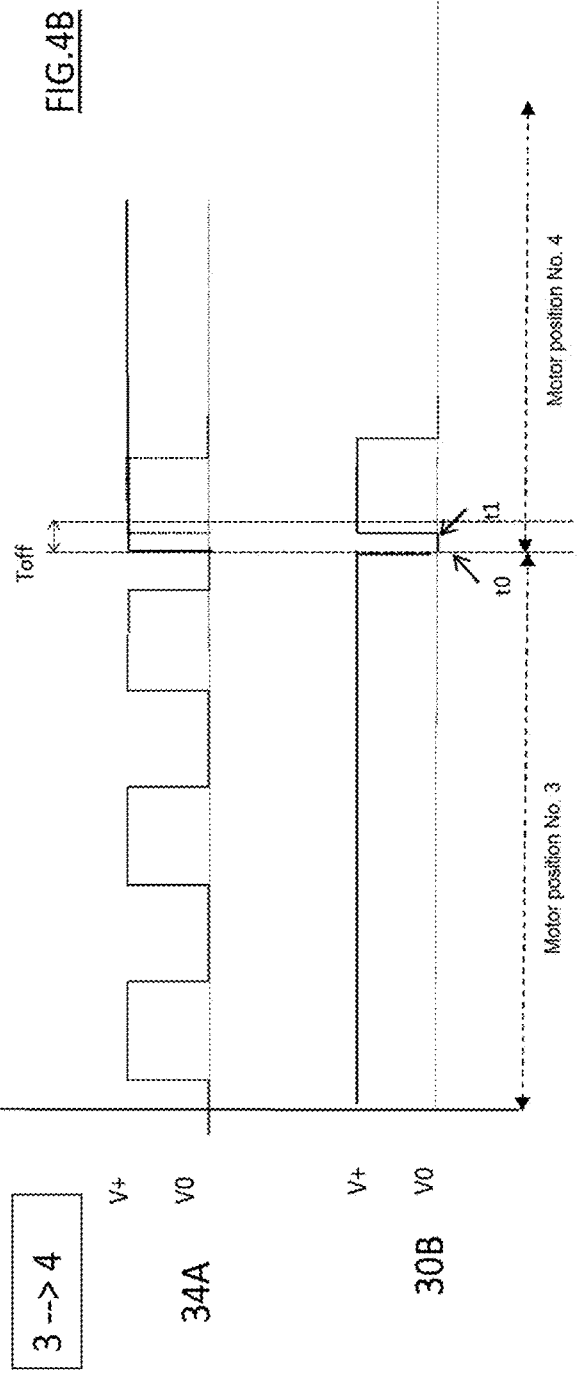

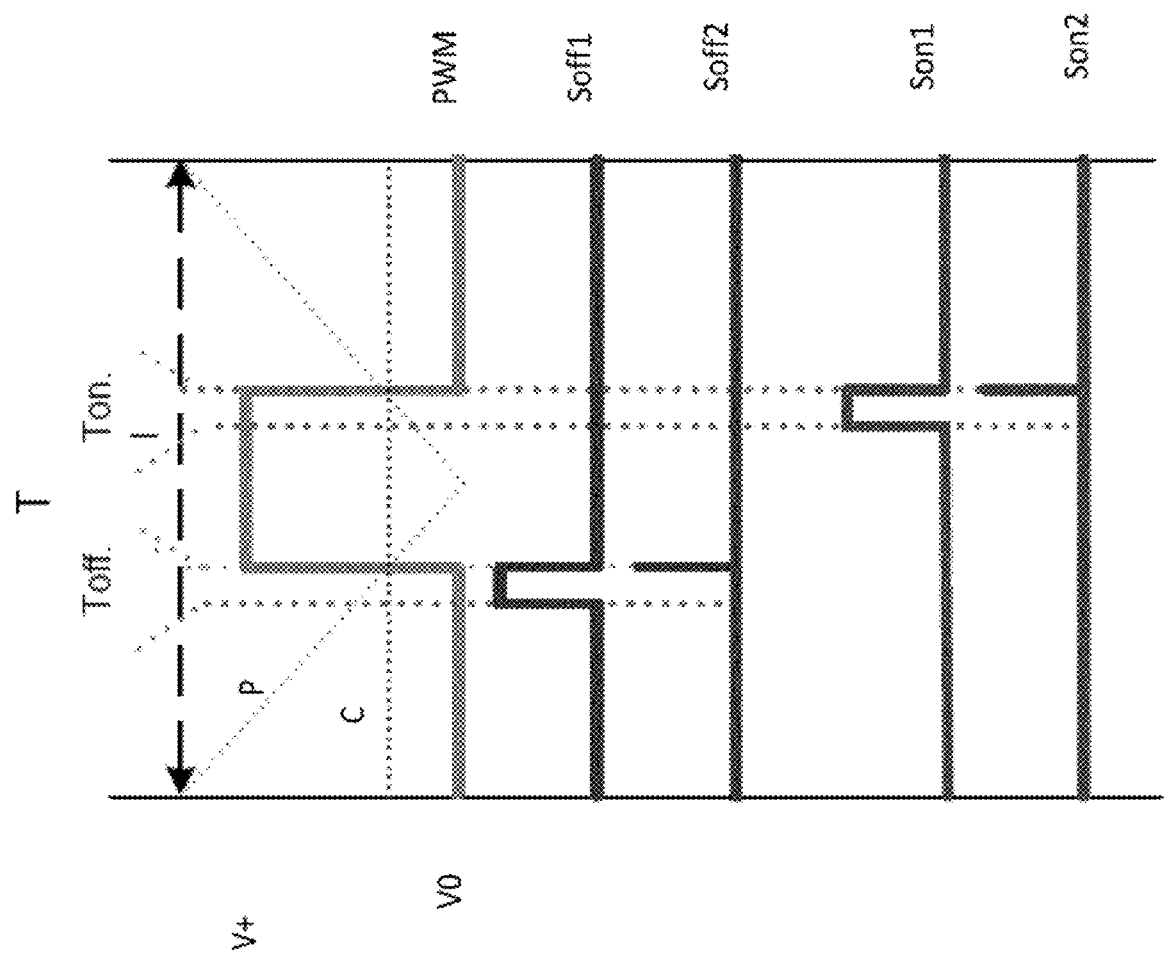

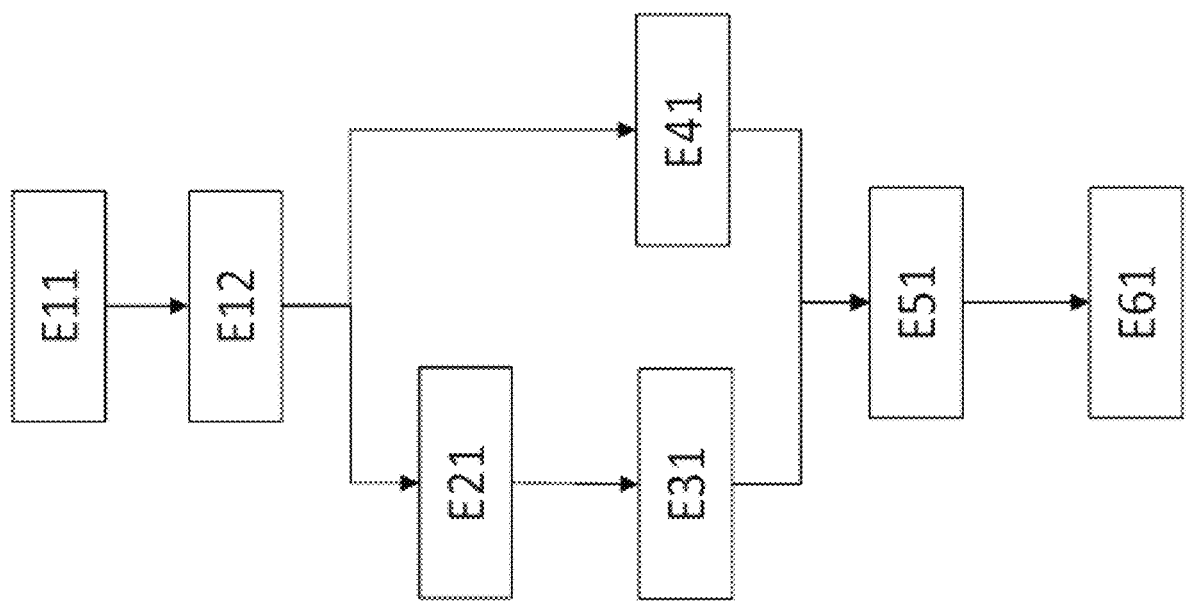

METHOD FOR CONTROLLING AN INVERTER

FIELD OF THE INVENTION

The invention relates to a method for controlling an inverter comprising a plurality of switches suitable for being controlled to open/close in order to regulate the power supply of a motor.

This method is particularly intended to be implemented to control the power supply of a fan motor on board an aircraft.

STATE OF THE ART

Aircrafts, and particularly commercial aircrafts, comprise a large number of electrical items of equipment for the steering assistance and the passenger comfort. These items of equipment include in particular fans for avionic cooling and ventilation systems. The aircrafts comprise an electrical network for supplying voltage to these various items of equipment. The electric voltage is provided to the network by means of voltage generators installed in the (propulsion or jet) engines of the aircraft. The electric voltage conveyed by the network is generally an AC voltage, since rectifiers allow converting this AC voltage into a DC voltage in order to supply the items of equipment requiring such a DC supply voltage.

The fans thus most often comprise an input rectifier to obtain a DC input voltage, the rectifier being followed by an inverter controlled by a control module to regulate the AC voltage supply to the fan motor, so that the rotational speed of the fan blades can be controlled.

Such an inverter includes a plurality of switches, each switch of which is adapted, for example, to be in the closed position when a control signal applied thereto takes the logic value "1", and to be in the open position when a control signal applied thereto takes the logic value "0".

The (open or closed) states of all the switches for a determined angular sector of the motor are controlled according to control laws. The set of the control laws defines a control table for the inverter.

In the context of a three-phase inverter, control laws have for example been developed specifically in order to optimize the (electrical and thermal) efficiency and the level of electromagnetic disturbance of the three-phase inverter used in a 120° control. Therefore, there is a plurality of control laws.

A switch has a maximum conducting and de-conducting time. For the conduction, this duration corresponds to the maximum time before which the switch enters into conduction after receiving the switching order from a control signal. Conversely, for the de-conduction, this duration corresponds to the maximum time before which the switch stops conducting after a control signal stops the de-switching order.

Two distinct aspects are to be considered:
- a switching/de-switching order which is smaller than the maximum conduction/de-conduction time is prohibited, because this may damage the switch and generate the electromagnetic pollution; and
- the generally used switch driver circuits have protection functions called de-saturation functions that are triggered erratically in the case of a switching order which is smaller than the maximum conduction/de-conduction time.

For these reasons, a system implementing a control law of the inverter must prohibit the generation of switching/de-switching orders that are inconsistent, in particular, with the specification of the switches used. Thus, more generally, the management of the conduction/de-conduction times depends on:
- the reference of the used power components (IGBT, MOSFET); and
- the control law used to monitor the inverter.

Thus, in the case of a 120° control law, the implementation of the function of management of the conduction/de-conduction times is made complex by:
- the reference variety of the used power components (IGBT, MOSFET suitable for 270Vdc, 540Vdc, 28Vdc DC networks);
- the variety of the control laws, each system having its own specificities; and
- the indeterministic nature of the motor sector changes which is the input element of the control table that defines the order of the successive switching operations of the switches.

The implementation of a new control law of the inverter is therefore made complex by the multiplicity of the parameters described above. Indeed, the implementation of such a law requires significant specification and testing efforts to avoid design errors during the implementation of specific functions of management of the conduction/de-conduction times of the switches of the inverter, ensuring the safety of the components of the inverter.

PRESENTATION OF THE INVENTION

The object of the invention is to propose a method for controlling an inverter which is adapted whatever the type of control law or of switch reference, and which is able to manage in a reliable and robust manner the unpredictable aspect of the motor position changes.

Particularly, an object of the invention is to propose a method for controlling an inverter that allows ensuring the management of the conduction/de-conduction times of the switches of the inverter.

Another object of the invention is to allow the implementation of such a solution for any type of control laws of an inverter.

The object is achieved in the context of the present invention thanks to a method for controlling an inverter configured to power supply a motor comprising a stator and a rotor adapted to be driven in rotation relative to the stator when the motor is power supplied, the inverter comprising a plurality of switches suitable for being controlled to open/close in order to regulate the power supply of the motor, each switch having a predetermined time of transition Toff from a closed state to an open state, and a predetermined time of transition Ton from the open state to the closed state, the method comprising the following steps of:
- generating a first DC digital signal having a first voltage level suitable for controlling the closing of a switch,
- generating a second DC digital signal having a second voltage level suitable for controlling the opening of a switch,
- generating a third cyclic digital signal alternating between the first voltage level and the second voltage level, suitable for controlling successively the opening and the closing of a switch,
- transmitting to each switch one of the digital signals, in accordance with a control law based on a position of the rotor relative to the stator, and
- during a change in the position of the rotor relative to the stator at an instant t0, delaying the execution of the control law, from the instant t0, as long as said execution produces a command to open one of the switches during a transition from the open state to the closed state (Ton violation), or a command to close one of the switches during a transition from the closed state to the open state (Toff violation) of said switch.

Said method thus makes it possible to easily and quickly implement new control laws, and ensure the safety of the components of the inverter by avoiding the design errors during the application of the specific functions of management of the conduction/de-conduction times by managing in a reliable and robust manner the unpredictable aspect of the motor position changes.

Advantageously but optionally, the system according to the invention can further comprise at least one of the following characteristics:

the third digital signal is transmitted simultaneously to one or several switch(es) of the plurality of switches;

the execution of the control law is delayed if:

one of the switches being controlled by the first DC digital signal, the control law indicates the transmission to said switch of the third cyclic digital signal, and at the instant t0, said signal is equal to the second voltage level and in a time smaller than the time of transition Toff between the closed state and the open state, equal to the first voltage level; or one of the switches being controlled by the second DC digital signal, the control law indicates the transmission to said switch of the third cyclic digital signal, and at the instant t0, said signal is equal to the first voltage level and in a time smaller than the time of transition Ton between the open state and the closed state, equal to the second voltage level; or one of the switches being controlled by the third cyclic digital signal, the control law indicates the transmission to said switch of the first DC digital signal, and at the instant t0, said switch is in transition from the closed state to the open state from a time smaller than Toff; or one of the switches being controlled by the third cyclic digital signal, the control law indicates the transmission to said switch of the second DC digital signal, and at the instant t0, said switch is in transition from the open state to the closed state from a time smaller than Ton;

the third cyclic digital control signal is a pulse width modulated signal;

each switch of the inverter is controlled by an associated control law, said control law being a 120° control law; and the motor comprises a plurality of angular sectors defined in a stationary manner relative to the stator and through which the rotor passes when the rotor is driven in rotation, and in that the detection of the change in the position of the rotor relative to the stator occurs at each angular sector change.

The invention also relates to a module for controlling an inverter configured to power supply a motor, the inverter comprising a plurality of switches controlled to open/close in order to regulate the power supply of the motor, each switch having a predetermined time of transition Toff between a closed state and an open state, and a predetermined time of transition Ton between the open state and the closed state, the motor comprising a stator and a rotor adapted to be driven in rotation relative to the stator, said control module being adapted to:

generate a first DC digital signal having a first voltage level suitable for controlling the closing of a switch, generate a second DC digital signal having a second voltage level suitable for controlling the opening of a switch, generate a third cyclic digital signal alternating between the first voltage level and the second voltage level, suitable for controlling successively the closing and the opening of a switch, at a predetermined frequency, transmit to each switch one of the digital signals, in accordance with a control law based on a position of the rotor relative to the stator;

said control module being further adapted to detect a change in angle of the rotor relative to the stator, and said module being configured to delay the execution, from an instant t0 of detecting a change in the position of the rotor relative to the stator, and said control module being configured to delay the execution, from the instant t0 of detecting the change in the position of the rotor, of the control law of the switches controlling the transmission of the third cyclic digital signal to a switch, and the transmission of the first or of the second signal to another switch, as long as said execution produces a command to open one of the switches during a transition from the open state to the closed state (Ton violation), or a command to close one of the switches during a transition from the closed state to the open state (Toff violation) of said switch.

The invention also relates to a system for power supplying a motor, the motor comprising a stator and a rotor rotatably mounted relative to the stator, the supply system comprising:

an inverter, comprising a plurality of switches controlled in order to regulate the power supply of the motor;

a module for controlling the inverter according to the previously described characteristics;

a sensor suitable for measuring a position of the rotor relative to the stator, said control module being a control module as defined previously;

in which the inverter is a three-phase inverter; and in which the control module is adapted to identify an angular sector of the motor in which the rotor is located based on the position measured by the sensor, and in that the control module is adapted to detect a position change when the rotor changes its angular sector.

The proposed method and system therefore make it possible to easily and quickly implement new control laws, while managing in a reliable and robust manner the unpredictable aspect of the motor position changes.

DESCRIPTION OF THE FIGURES

Other characteristics, objects and advantages of the present invention will become apparent upon reading the following detailed description, in relation to the appended figures, given by way of non-limiting examples and in which:

FIGS. 3A and 3C represent a control law table of an inverter;

FIGS. 3B and 3D represent a table of transitions of the commands of an inverter according to one embodiment of the invention;

FIGS. 4A and 4B schematically illustrate the control of switches according to control signals;

FIG. 6 represents signals relating to a cyclic control signal according to one embodiment of the invention; and FIG. 7 schematically represents the main steps of a control method implemented by the control module according to one embodiment of the invention.

DETAILED DESCRIPTION OF AT LEAST ONE EMBODIMENT OF THE INVENTION

Figure 1:
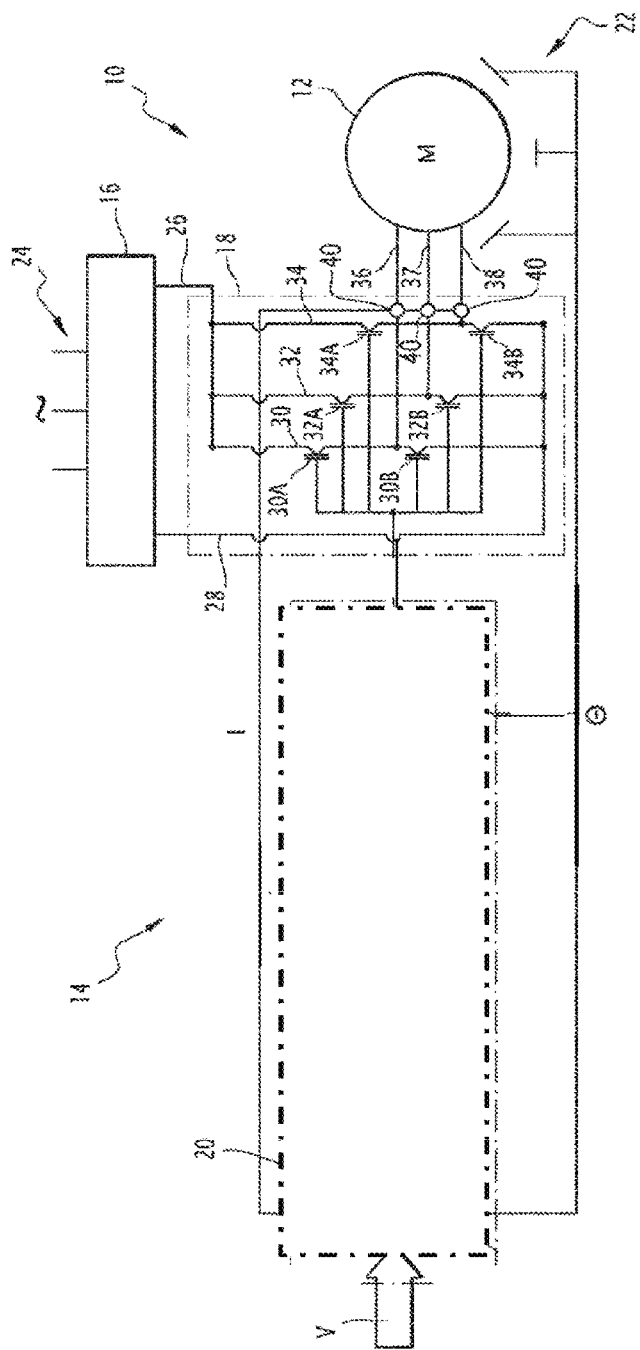
FIG. 1 schematically represents a system for power supplying a motor according to one embodiment of the invention.

Referring to FIG. 1, a fan 10 comprises an electric motor 12 and a system 14 for power supplying the motor 12. In known manner, the motor 12 comprises a stator (not represented) and a rotor (not represented) rotatably mounted relative to the stator. The rotor carries permanent magnets, or a winding. Windings (not represented), carried by the stator, are adapted to generate a magnetic field under the effect of which the rotor is driven in rotation relative to the stator. The rotor is substantially cylindrical and the stator extends substantially coaxially about or inside the rotor. The rotor is adapted to rotate about its axis. An angle is defined between the stator and the rotor relative to a reference position of the rotor relative to the stator. The supply system 14 comprises a rectifier 16, an inverter 18 suitable for power supplying the motor 12, a filter (not represented) of the rectifier 16 between said rectifier 16 and the inverter 18, a module 20 for controlling the inverter 18, and a sensor 22 for measuring the angle G of the rotor of the motor 12 relative to the stator.

The sensor 22 is typically a Hall-effect sensor adapted to determine the angle of the rotor based on the orientation of the magnetic field seen by the sensor 22. Particularly, the motor 12 is divided into angular sectors (not represented), and the sensor 22 is adapted to identify the angular sector in which the angle formed between the rotor and the stator lies. The number of angular sectors is for example equal to six. The rectifier 16 is interposed between an electrical network 24, typically an electrical network of an aircraft, and the inverter 18. The latter is adapted to convert the AC voltage conveyed by the electrical network 24 into a substantially DC supply voltage of the inverter 18. The rectifier 16 is electrically connected to the inverter 18 via a positive line 26, to a substantially constant positive potential, and via a negative line 28, to a substantially constant negative potential. The inverter 18 includes three switching branches 30, 32, 34 mounted in parallel between the positive 26 and negative 28 lines. Each branch, respectively 30, 32, 34, includes two controlled switches, respectively 30A, 30B, 32A, 32B, 34A, 34B, connected in series and between which an output line, respectively 36, 37, 38, is connected for the supply of the motor 12. Particularly, the output lines 36, 37, 38 are adapted to supply the windings of the stator with electric current. In the exemplary embodiment of FIG. 1, each output line 36, 37, 38 corresponds to a phase from the three-phase supply of the motor 12.

For each branch, respectively 30, 32, 34, a first switch, respectively 30A, 32A, 34A, is disposed between the positive line 26 and the associated output line, respectively 36, 37, 38, and a second switch, respectively 30B, 32B, 34B, is disposed between the negative line 28 and the associated output line, respectively 36, 37, 38. Each switch 30A, 30B, 32A, 32B, 34A, 34B is able to switch between a closed position, in which it electrically connects the positive 26 or negative 28 line to the associated output line 36, 37, 38, and an open position, in which it electrically insulates said lines. Each switch 30A, 30B, 32A, 32B, 34A, 34B is preferably a transistor, for example an Insulated Gate Bipolar Transistor (IGBT). Optionally, a diode is associated with each switch 30A, 30B, 32A, 32B, 34A, 34B, in anti-parallel.

The inverter 18 also comprises current sensors 40 for measuring a current I flowing in each output line 36, 37, 38. As a variant, the inverter 18 comprises a single current sensor 40 between the negative line 28 and the filter of the rectifier 16. The control module 20 is adapted to generate a cyclic digital signal S for controlling the switches 30A, 30B, 32A, 32B, 34A, 34B, based on the measured angle G of the rotor relative to the stator and on the measured current I flowing in each output line 36, 37, 38 (current regulation), but also based on the speed calculated by the control module 20 via the sensor 22 (speed regulation). By "cyclic digital signal" is meant a signal adapted to take exclusively two voltage values Vo, V+, the first voltage value V+ corresponding to a logic "1" and the second voltage value V0 corresponding to a logic "0", the first value being greater than the second value.

The cyclic digital signal S alternating between the first voltage level V+ and the second voltage level V0, is therefore suitable for successively controlling the closing and the opening of a switch.

Figure 2A:
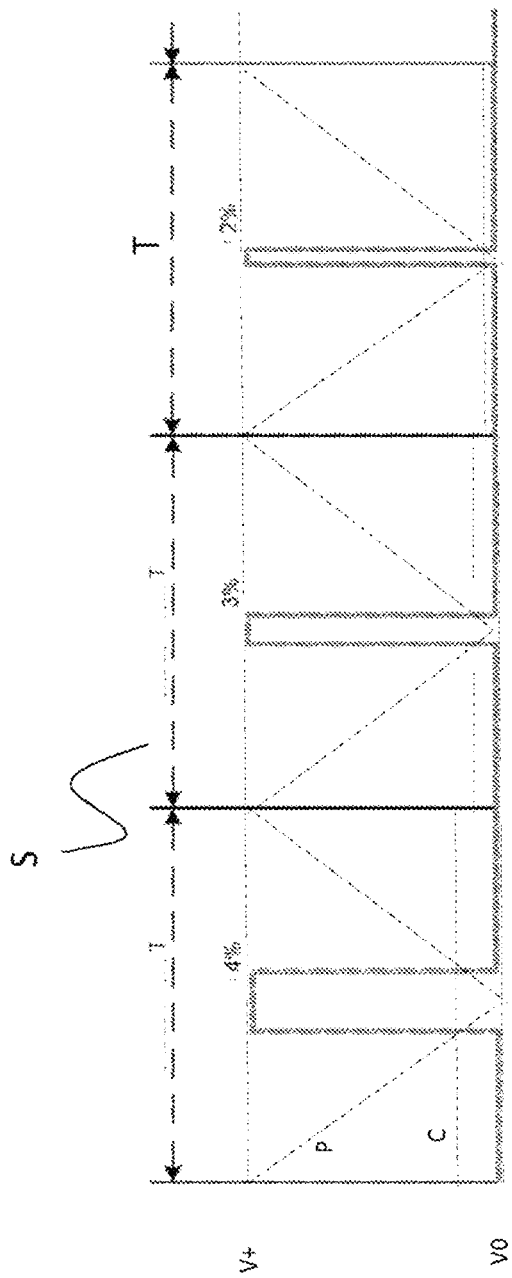
FIG. 2A represents a cyclic digital signal.
Figure 2B:
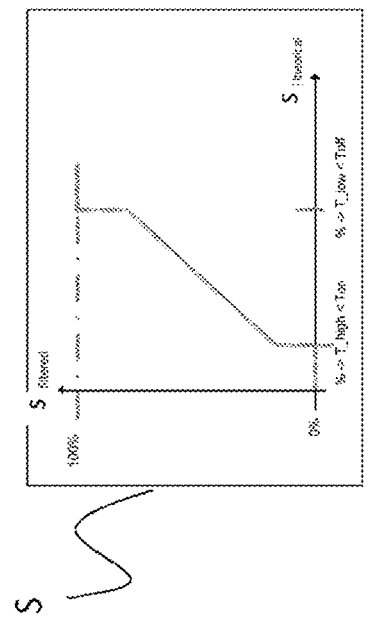
FIG. 2B represents a filtered cyclic digital signal according to the invention.

The signal is thus coded on a single bit. The signal is further divided into regular cycles, and changes its value at most two times during each cycle. Particularly, the signal is a square signal, each square being centered in the middle of a cycle of the signal. The cyclic digital control signal S has a variable cyclic ratio, that allows adapting the rotational speed of the motor, that is to say, the ratio between the duration during which the signal S takes the logic value "1" and the duration during which the signal S takes the logic value "0" during each cycle T of the signal S varies from one cycle T to the other, as represented in FIG. 2A. The cyclic digital control signal S can also be saturated as illustrated in FIG. 2B so as not to generate an order to open and close the switches violating the times of conducting/de-conducting one of the switches. The cyclic digital control signal S is preferably of the pulse width modulation (PWM) type.

The control module 20 is also adapted to transmit said cyclic digital control signal S selectively to each of the switches 30A, 30B, 32A, 32B, 34A, 34B. In other words, the control module 20 is adapted to transmit the cyclic digital control signal S to all switches 30A, 30B, 32A, 32B, 34A, 34B. The control module 20 is adapted to generate and transmit DC digital control signals to the switches 30A, 30B, 32A, 32B, 34A, 34B.

The control module 20 is also adapted to transmit a first DC digital signal S0, having a first voltage level Vo suitable for controlling the opening of a switch, and taking for example the logic value "0" representative of an inactive state of the signal.

Similarly, the control module 20 is adapted to transmit a second DC digital signal S1, having a second voltage level V+ suitable for controlling the closing of a switch, and for example taking the logic value "1" representative of an active state of the signal.

Figures 3A, 3B:

FIG. 3A, considering the control table TC, illustrates the switching from the position of the motor no. 2 to the position of the motor no. 3. Thus, the cyclic signal S is applied successively on the switch 32A then, as soon as the angular sector of the motor changes, on the switch 34A.

In the control law defined by the position of motor no. 2, the switch 34A receives an inactive signal S0, it is therefore in the open state. As illustrated, in FIG. 4A, the motor sector change at an instant t0 may generate a violation in the time of transition between the open state and the closed state (Ton) on the switch 34A, if this change occurs in a window, between an instant t0 where the cyclic signal S is in the active state and an instant t1 where the cyclic signal S is in the inactive state, smaller than Ton. Indeed, the motor section change is not temporally predictable, because the operation of the motor can be asynchronous. Thus, in this case, it is observed that the switch 34A is controlled to close at the instant t0, then to open at the instant t1, before the transition time Ton has elapsed.

By analogy, the motor sector change can generate a violation in the transition time Ton on the switch 32A, if at an instant t0, an inactive DC signal S0 is applied to the switch while the signal S is in the active state from a time smaller than Ton.

The control table TC also represents the case of transitions from the cyclic signal S to an active DC signal S1 or vice versa. Such transitions are also at risk, as they are likely to generate violations in the time of transition between the closed state and the open state of the switches (Toff).

Thus, in the case of transition of a cyclic signal S to an active DC signal S1, if the transition occurs at an instant t1, instant of the switching from an active state to an inactive state, a switch is in a de-conduction period. The sending of a command to switch to an active state via an active DC signal S1 therefore causes a violation in the transition time Toff.

Similarly, as illustrated in FIG. 4B, the transition from an active constant signal S1 to a cyclic signal S, at an instant t0 where the signal S is inactive, causes a violation in the de-conduction time Toff of a switch if the delay between the instant t0 and an instant t1 of switching to the active state of the cyclic signal S is smaller than the transition time Toff. Indeed, in this case, the switch receives via the cyclic signal S, a command to switch from the active state to the inactive state, then from the inactive state to the active state within a delay smaller than the transition time Toff.

FIG. 3C represents a control table TC' in which the cyclic signal S is applied on a plurality of switches for a position of the given motor. A cyclic signal can be in the form of a signal/S, complementary to the cyclic signal S.

FIG. 3B illustrates a transition table TT, associated with a control table TC corresponding to a set of control laws of the switches based on the position of the motor. The control laws succeed each other in a predetermined order corresponding to the sequencing of the positions of the motor. Similarly, FIG. 3B illustrates a transition table TT', associated with a control table TC'.

According to a table of control laws TC/TC', the transition table TT/TT', of dimension identical to the control table TC/TC' is configured, for example in an automatic manner. Said transition table TT/TT' indicates, for each switch, at each motor position, the transition to come between a first control law and a second successive control law. Thus, the transition table TT/TT' comprises the following constants:
- NF: Case of the transitions from a DC signal to another DC signal, this case does not pose problems of violation in the transition times;
- HP: Case of the transitions from a cyclic signal S to an inactive DC signal S0, these transitions can induce violations in the transition times Ton;
- LP: Case of the transitions from a cyclic signal S to an active DC signal S1, these transitions can induce violations in the transition times Toff;
- DF: Case of the transitions from an inactive DC signal to a cyclic signal S, these transitions can induce violations in the transition times Ton;
- DN: Case of the transitions from an active DC signal to a cyclic signal S. These transitions can induce violations in the transition times Toff.

Figure 5:
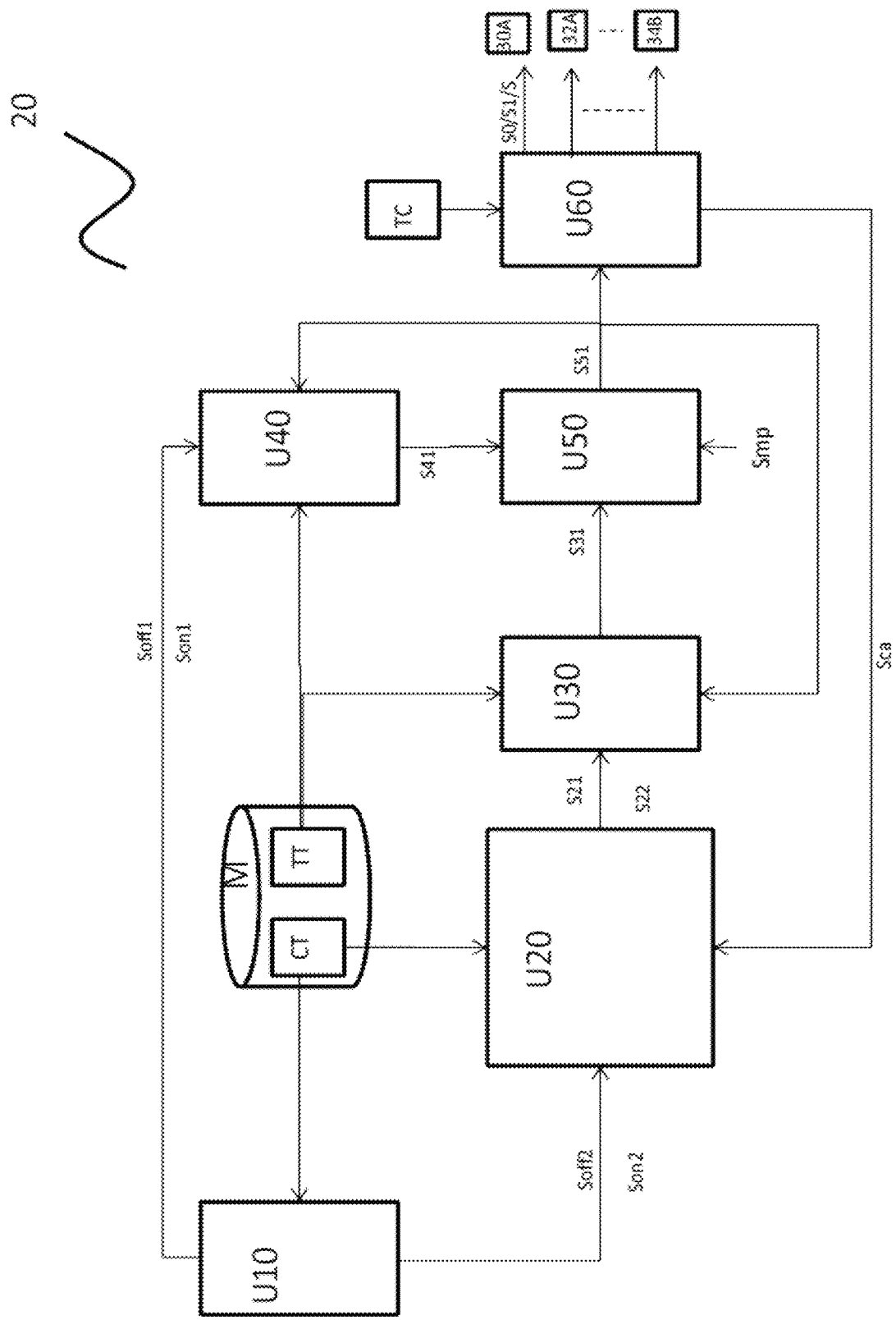
FIG. 5 represents a module for controlling the switches of an inverter according to one embodiment of the invention.

With reference to FIG. 5, the control module 20 comprises a signal generation unit U10.

FIG. 6 also illustrates the main steps of a method for controlling an inverter, allowing the management of the transition times, and implemented by the control module 20.

Said unit U10 generates, in a step E11, a cyclic signal S by a comparison between a decreasing or increasing triangular carrier P of a period T and a setpoint value C derived from a proportional-integral type regulator (which can be a speed or a current regulator), as illustrated in FIG. 7 in the case of a decreasing carrier P. In the case of a decreasing carrier P, the cyclic signal S is set to the active state if the triangular carrier is below the setpoint value, otherwise, it is set to the inactive state. Conversely, in the case of an increasing carrier, the cyclic signal S is set to the active state if the triangular carrier is above the setpoint value, otherwise, it is set to the inactive state.

The values of the transition times Toff and Ton are stored in a memory M in the form of constants CT. These values are defined by the characteristics of the components of the switches.

Said unit U10 also generates, in a step E12, a plurality of signals characteristic of different instants of the cyclic signal S, which can be determined based on the values of the transition times Toff and Ton.

FIG. 6 illustrates the generation of said plurality of signals (only the case of a decreasing carrier is described, the case of an increasing carrier is obtained by analogy):
- Soff1: This signal is positioned in the active state when the triangular carrier P is in the next interval, otherwise, it is positioned in the inactive state: setpoint value $C+Toff \geq$ triangular carrier $P \geq$ setpoint value C. The signal Soff1 informs that the cyclic signal S will switch to the active state within a delay smaller than the transition time Toff. This signal therefore allows the management of the cases of transitions DN (transition from an active DC signal S1 to a cyclic signal S) of a control table.
- Son1: This signal is positioned in the active state when the triangular carrier P is in the following interval, otherwise, it is positioned in the inactive state: setpoint value $C-Ton \leq$ triangular carrier $P \leq$ setpoint value C. The signal Son1 informs that the cyclic signal S will switch to the inactive state within a delay smaller than the transition time Ton. This signal therefore allows indicating the case of the transitions DF (transition from an inactive DC signal S0 to a cyclic signal S) of a control table.
- Soff2: This signal is positioned in the active state when the triangular carrier is in its descending phase equal to the setpoint value C, otherwise it is positioned in the inactive state. This instant corresponds to setting the cyclic signal S to the active state. The signal Soff2 informs that the cyclic signal S has just switched to the active state. This signal therefore allows indicating the case of the transitions HP (transition from a cyclic signal S to an inactive DC signal S0) of a control table.
- Son2: This signal is positioned in the active state when the triangular carrier is in its ascending phase equal to the setpoint value C, otherwise it is positioned in the inactive state. This instant corresponds to setting the cyclic signal S to the inactive state. The signal Son2 informs that the cyclic signal S has just switched to the inactive state. This signal therefore allows indicating the case of the transitions LP (transition from a cyclic signal S to an active DC signal S1) of a control table.

The signals Soff2 and Son2 are then transmitted to a counter unit U20. Said counter unit U20 comprises a plurality of counters associated with each switch. Thus, a switch is associated with two counters, a transition time Ton counter and a transition time Toff counter. The counters are triggered only for the switch(es) on which the cyclic signal S is applied (called switch(es) in the process of division Ca) according to the control table for a position of the given motor. The unit U20 is adapted to determine the switch(es) in the process of division by receiving a signal Sca based on the position of the motor, whose origin is detailed below in the description. A transition time Ton counter is triggered by the signal Soff2 for a switch Ca which is in the division phase according to the control table used. Conversely, the transition time Toff counter is triggered by the signal Son2 for the switch(es) Ca according to the control table used.

In a step E21, the counter unit U20 generates two output signals S21 and S22. These signals are for example encoded by a number of bits corresponding to the number of switches. A given bit being associated with a given switch. The bits corresponding to the switches that are not in the process of division are in the active state (equal to 1). In the signal S21, the bit associated with a switch Ca is in the active state if and only if a transition time Ton has elapsed from the last activation of the signal Soff2, otherwise, it is in the inactive state.

Conversely, in the signal S22, the bit associated with a switch Ca is in the active state if and only if a transition time Toff has elapsed from the last activation of the signal Son2, otherwise, it is in the inactive state.

Thus, the output signals S21 and S22 inform whether a switch Ca is controlled in the active state from a time greater than Ton or controlled in the inactive state from a time greater than Toff.

This information allows managing the case of the transitions from a cyclic signal S to an inactive S0 or active S1 DC signal (transition HP or LP) of the control table.

These signals are therefore emitted towards a cyclic signal transition unit U30 also taking into account the state of the transitions to come of the switches.

Thus, the cyclic signal transition unit U30 is configured to:
receive the pairs of signals S21 and S22 derived from the counter unit U20;
receive a signal indicating the position of the motor S51 whose origin is detailed below in the description; and
access the transition table TT.

The cyclic signal transition unit U30 is composed for example of a demultiplexer which allocates to its output signal S31, based on the position of the motor S51 and on the content of the transition table TT, the state of the signal S21 or S22 or the value of the active state (for example 1).

By knowing the position of the motor, the cyclic signal transition unit U30 is positioned in the transition table TT and therefore determines the transitions to come for each switch.

Thus, for each switch, the unit U30 determines based on the position of the motor, the nature of the transition to come. Then, in the case of transition HP or LP, the filter unit transmits respectively the value of the signal S21 or S22. In case another transition is applied, the value 1 is transmitted.

Thus, at the output of this unit, for example in case the signal S31 is coded on a plurality of bits equal to the number of switches, it is defined as follows:

All its bits (one for each switch) are in the active state:
if for a transition HP (cyclic signal S to inactive DC signal S0), the transition time Ton is exceeded on the switch(es) Ca in the process of division or vice versa,
if for a transition LP (cyclic signal S to active signal DC S1), the transition time Toff is exceeded on the switch(es) in the process of division.
Otherwise, if a transition time Ton or Toff violation is possible, the bit associated with a switch Ca in the process of division is in the inactive state.

Thus, the units U20 and U30 allow determining, for the switch(es) Ca receiving a cyclic signal S, whether it is/they are outside an opening or closing time and therefore likely to be controlled to close or open without causing violation in the transition times.

A DC signal transition unit U40 allows, for its part, managing the transition times during the motor position change for a switch that must receive the cyclic signal S. Thus, a delay filter unit U40 is configured to:
receive the 2 signals Soff1 and Son1 transmitted by the unit U10;
receive a signal indicating the position of the motor S51; and
access the transition table TT.

The DC signal unit U40 is a demultiplexer which allocates to its output signal S41, based on the position of the motor S51 and on the content of the transition table TT, the state of Soff1 and Son1 or the value of the inactive state (for example 0).

Thus, by knowing the position of the motor, the DC signal unit U40 is positioned in the filter table and therefore determines the transitions to come for each switch. The DC signal unit U40 therefore determines, based on the position of the motor, the nature of the transition to come. Then, if this filter corresponds to a transition DN (active DC signal to cyclic signal S) or DF (inactive DC signal to cyclic signal S), the unit U40 transmits respectively the value of the signal Son1 or Soff1. In the case where another transition is applied, the value 0 is transmitted.

Subsequently, in a step E41 parallel to the steps E21 and E31, at the output of this unit, for example in the case where the signal S41 is coded on a plurality of bits equal to the number of switches, it is defined as follows:

All its bits (one for each switch) are in the inactive state:
if for a transition DN (active DC signal S1 to cyclic signal S), the cyclic signal S is not at a time Toff of switching to the active state or vice versa,
if for a transition DF (inactive DC signal S0 to cyclic signal S), the cyclic signal S is not at a time Ton of switching to the inactive state.
Otherwise, if a transition time Ton or Toff violation is possible, the bit associated with a switch that will enter into division is in the active state.

Then, a motor position unit U50 is configured to receive the different signals from the units U30 and U40. Said unit U50 is also configured to receive a signal representing the position of the motor Smp. The positioning of the motor is for example transmitted by the angular sector sensors 22.

In a step E51, the output signal S51 of the motor position unit U50 is equal to the signal Smp if and only if:
the totality of the bits of the signal S31 are active. That is to say, there is no risk of violation in the transition times Ton and Toff on the transitions HP (cyclic signal S to inactive DC signal S0) and LP (cyclic signal S to active DC signal S1) of the control table and this based on the current position of the motor and on the transition to come.

the totality of the bits of the signal S41 are inactive. That is to say, there is no risk of violation in the transition times Ton and Toff on the transitions DN (active DC signal S1 to cyclic signal S) and DF (inactive DC signal S0 to cyclic signal S) of the control table and this based on the current position of the motor and on the transition to come.

Otherwise:

the output signal S51 is not updated as long as the two previous conditions are not met. The motor position change is therefore not taken into account.

This output signal is also sent towards a control unit U60. This unit applies the control table TC, based on the position of the motor given by the signal S51. The use of the signal S51 guarantees the integrity of the commands applied to the switches, i.e. filtered from any risk of violation in the transition times Ton or Toff.

This unit U60 implements a demultiplexer and also generates the signal Sca. This signal contains 6 bits, one for each of the switches. Based on the position of the motor given by the signal S51, the bit corresponding to a switch Ca which is in the process of division (the one receiving the cyclic signal S) is positioned in the active state, all other bits are positioned in the inactive state. Thus, the signal S51 allows positioning in the control table and, in a step E61, sending by the unit U60 a set of control signals (S0, S1 or S), corresponding to the positioning of the motor according to the signal S51, to the switches. Consequently, the transmission of the signal S51 allows filtering and/or delaying the commands of the switches corresponding to a motor position change, as long as said change is likely to induce a violation in the opening or closing time of one of the switches.

The control method and module as described above can be advantageously implemented on microcomputers, microcontrollers, on board systems, logic circuits FPGA or ASIC. Said method proposes a solution of implementation based only on simple logic functions, i.e. comparators, multiplexers/demultiplexers, up/down counters, logic gates and flip-flops. The method therefore proposes a solution of universal hardware implementation that uses elementary logic resources present in all the logic circuit families. This technical solution can therefore be transposed to any type of FPGA or ASIC regardless of the manufacturer of the component.

The method therefore allows a solution of implementation which is universal in its compatibility, by a simple reconfiguration, with all conceivable 120° control tables TC.

The method can therefore be applied simply, quickly, while ensuring reliability in implementing new control laws.

The invention claimed is:

1. A method for controlling an inverter configured to power supply a motor comprising a stator and a rotor adapted to be driven in rotation relative to the stator when the motor is power supplied, the inverter comprising a plurality of switches suitable for being controlled to open/close in order to regulate the power supply of the motor, each switch having a predetermined time of transition from a closed state to an open state, and a predetermined time of transition from the open state to the predetermined closed state, the method comprising the following steps:

generating a first DC digital signal having a first voltage level suitable for controlling the closing of a switch, generating a second DC digital signal having a second voltage level suitable for controlling the opening of a switch, generating a third cyclic digital signal alternating between the first voltage level and the second voltage level, suitable for controlling successively the opening and the closing of a switch, transmitting to each switch one of the digital signals, in accordance with a control law based on a position of the rotor relative to the stator; and during a change in the position of the rotor relative to the stator at an instant t0, delaying the execution of the control law, from the instant t0, as long as said execution produces a command to open one of the switches during a transition from the open state to the closed state of the switch, or a command to close one of the switches during a transition from the closed state to the open state of the switch.

2. The control method according to claim 1, wherein in accordance with the control law, the third cyclic digital signal is transmitted to at least one switch of the plurality of switches.

3. The control method according to claim 2, wherein the execution of the control law is delayed if:

one of the switches being controlled by the first DC digital signal, the control law indicates the transmission to said switch of the third cyclic digital signal, and at the instant t0, said signal is equal to the second voltage level and in a time smaller than the predetermined time of transition from the open state to the closed state, equal to the first voltage level; or one of the switches being controlled by the second DC digital signal, the control law indicates the transmission to said switch of the third cyclic digital signal, and at the instant t0, said signal is equal to first voltage level and in a time smaller than the predetermined time of transition from the closed state to the open state, equal to the second voltage level; or one of the switches being controlled by the third cyclic digital signal the control law indicates the transmission to said switch of the first DC digital signal, and at the instant t0, said switch is in transition from the closed state to the open state from a time smaller than the predetermined time of transition from a closed state to an open state; or one of the switches being controlled by the third cyclic digital signal the control law indicates the transmission to said switch of the second DC digital signal, and at the instant t0, said switch is in transition from the open state to the closed state from a time smaller than the predetermined time of transition from an open state to a closed state.

4. The control method according to claim 1, wherein the third cyclic digital control signal is a pulse width modulated signal.

5. The control method according to claim 1, wherein each switch of the inverter is controlled by an associated control law, said control law being a 120° control law.

6. The control method according to claim 1, wherein the motor comprises a plurality of angular sectors defined in a stationary manner relative to the stator and through which the rotor passes when the rotor is driven in rotation, and wherein the detection of the change in the position of the rotor relative to the stator occurs at each angular sector change.

7. A module for controlling an inverter configured to power supply a motor, the inverter comprising a plurality of switches controlled to open/close in order to regulate the power supply to the motor, each switch having a predetermined time of transition from a closed state to an open state, and a predetermined time of transition from the open state to the closed state, the motor comprising a stator and a rotor adapted to be driven in rotation relative to the stator, said control module being adapted to:

generate a first DC digital signal having a first voltage level suitable for controlling the closing of a switch, generate a second DC digital signal having a second voltage level suitable for controlling the opening of a switch, generate a third cyclic digital signal alternating between the first voltage level and the second voltage level, suitable for controlling successively the closing and the opening of a switch, at a predetermined frequency, transmit to each switch one of the digital signals, in accordance with a control law based on a position of the rotor relative to the stator;

said control module being further adapted to detect a change in the position of the rotor relative to the stator, and said control module being configured to delay the execution, from an instant t0 of detecting the change in the position of the rotor, of the control law of the switches controlling the transmission of the third cyclic digital signal to a switch, and the transmission of the first or of the second signal to another switch, as long as said execution produces a command to open one of the switches during a transition from the open state to the closed state of the switch, or a command to close one of the switches during a transition from the closed state to the open state of the switch.

8. A system for power supplying a motor, said motor comprising a stator and a rotor rotatably mounted relative to the stator, the supply system comprising:
an inverter, comprising a plurality of switches controlled in order to regulate the power supply of the motor,
an inverter control module, and
a sensor suitable for measuring a position of the rotor relative to the stator, said control module being a control module according to claim 7.

9. The power supply system according to claim 8, wherein the inverter is a three-phase inverter.

10. The power supply system according to the preceding claim 9, wherein the control module is adapted to identify an angular sector of the motor in which the rotor is located based on the position measured by the sensor, and wherein the control module is adapted to detect a position change when the rotor changes its angular sector.

* * * * *

UNITED STATES PATENT AND TRADEMARK OFFICE
CERTIFICATE OF CORRECTION

PATENT NO. : 11,146,183 B2
APPLICATION NO. : 16/635726
DATED : October 12, 2021
INVENTOR(S) : Bourse et al.

Page 1 of 1

It is certified that error appears in the above-identified patent and that said Letters Patent is hereby corrected as shown below:

In the Claims

In Column 12, Claim 3, Line 38, delete "signal" and insert -- signal, --, therefore.

In Column 12, Claim 3, Line 45, delete "signal" and insert -- signal, --, therefore.

In Column 14, Claim 10, Line 19, delete "the preceding".

Signed and Sealed this
Twenty-sixth Day of April, 2022

Katherine Kelly Vidal
*Director of the United States Patent and Trademark Office*